Patented June 19, 1945

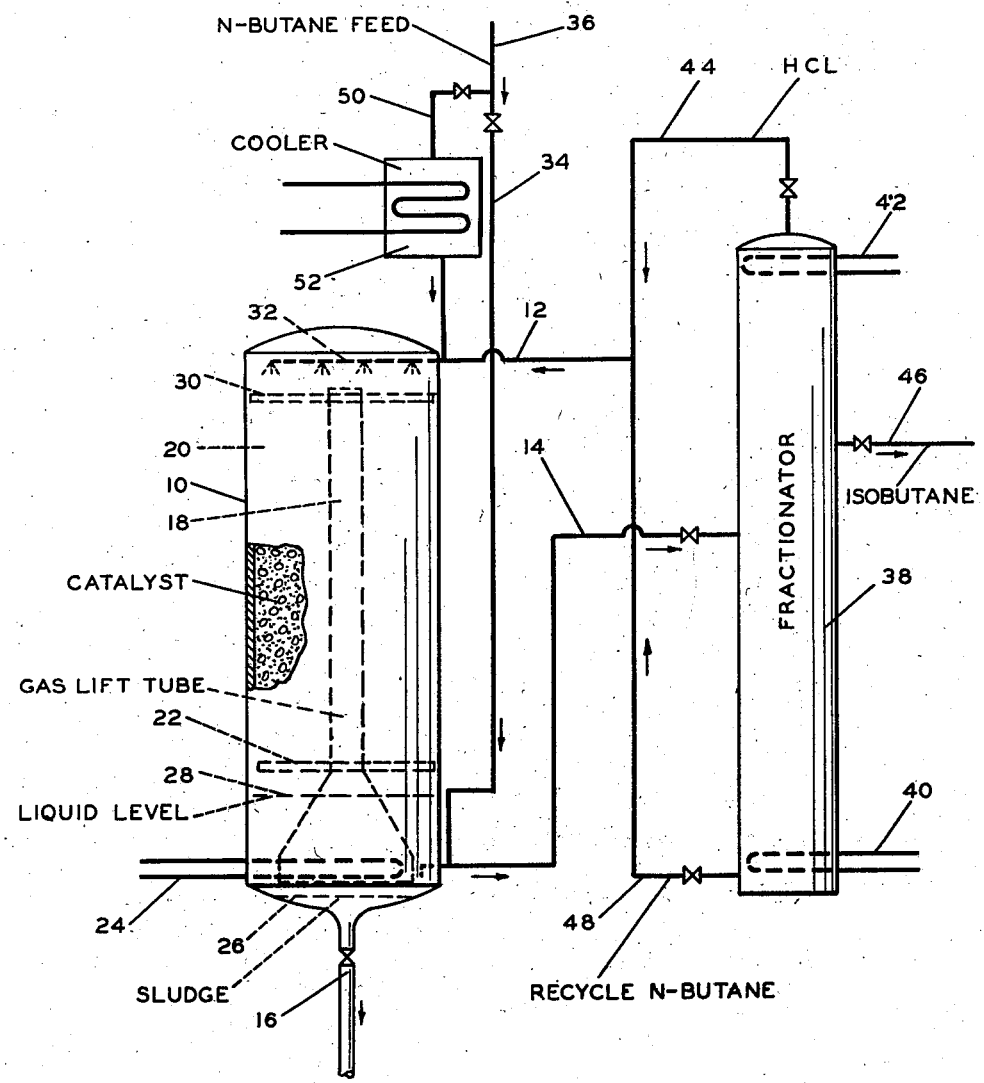

2,378,728

UNITED STATES PATENT OFFICE 2,378,728

ISOMERIZATION OF HYDROCARBONS

Wendell W. Roach, Kansas City, Mo., assignor to Phillips Petroleum Company, a corporation of Delaware Application April 10, 1943, Serial No. 482,637

7 Claims. (Cl. 260—683.5)

This invention relates to the isomerization of saturated hydrocarbons. The term "saturated hydrocarbons" includes paraffins and cycloparaffins, and by various modifications of the invention I can convert normal paraffins to isoparaffins and the reverse, and, for cycloparaffins, I can change the number of carbon atoms in the ring, as in converting methylcyclopentane to cyclohexane, dimethylcyclopentane to methylcyclohexane, etc. The invention is particularly applicable to the isomerization of such hydrocarbons in liquid phase in the presence of solid metal halide isomerization catalysts of the Friedel-Crafts type as represented by aluminum chloride, usually activated with the corresponding hydrogen halide such as hydrogen chloride.

Isomerization of normal butane to isobutane has become a commercially important process and to date has been largely accomplished by once-through passage of normal butane and hydrogen chloride in the vapor phase over solid anhydrous aluminum chloride. One of the principal difficulties with such processes is the sublimation of aluminum chloride whereby it passes from the reactor in admixture with the effluent hydrocarbons and deposits at other points in the system, thus fouling lines, valves, heat exchangers, and the like. It has heretofore been the practice to operate such a vapor phase isomerization at a pressure of the order of ten atmospheres to minimize this sublimation. The formation of a liquid phase in the reactor has commonly been deliberately prevented by the use of superheated vapor phase. In such processes control of temperature has been found to be difficult to obtain, and local overheating in the catalyst chambers gives rise to greatly accelerated sublimation of aluminum chloride and increased sludge formation from the remaining catalyst. Attempts have been made to control the factors of reaction temperature, dissipation of reaction heat, and volatilization of catalyst by controlling the temperature and partial pressure of the butane vapor, as by quenching with limited amounts of liquid butane, or by indirect heat exchange with the reaction zone, with varying but not complete success.

Isomerization is an equilibrium reaction and the percentage conversion obtainable at any given temperature is thermodynamically limited. As the concentration of the isomeric product, such as isobutane when isomerizing normal butane, increases, the rate of conversion decreases. Thus a serious problem is presented in that an extended reaction time is required to obtain near-maximum yields in a once-through process. On the other hand if a short reaction time is used, a low conversion is obtained and excessive separation costs are incurred in obtaining unreacted material for recycle.

An object of this invention is to isomerize saturated hydrocarbons. Another object is to provide an improved process for the isomerization of normal butane to isobutane using anhydrous aluminum chloride as the catalyst. Another object is to effect the isomerization of hydrocarbons in the liquid phase. A further object is to provide an isomerization process in which the temperature is constantly under complete control. A further object is to avoid sublimation of aluminum chloride and other relatively volatile metal halide catalysts. An important object is to provide a process for the isomerization of saturated hydrocarbons wherein a high ultimate yield of the desired isomers is obtained while utilizing the advantages of a low per-pass yield operation. Yet another object is to effect isomerization of paraffin hydrocarbons with sludge-forming metal halide catalysts in such a manner as to hold sludge formation at a minimum. Another object is to minimize corrosion or erosion of apparatus caused by sludge movement. A further object is to provide apparatus of particular form which is especially adapted for carrying out such processes. Other objects and advantages of the invention will be apparent from the accompanying disclosure and description.

In a preferred embodiment of my invention, a vertical catalytic reaction chamber is constructed in such a way as to provide three principal zones therein. An open circulation tube is centrally disposed in the reactor extending from the lower to the upper zone. The aluminum chloride or other solid catalyst is disposed in the central zone in the annular space formed by the circulation tube and the walls of the chamber. The lower portion of the circulation tube is enlarged and a heating coil disposed therein. The liquid level of the reactants is maintained above this lower portion of the circulation tube and heating coil.

In operation, steam or other heating medium is supplied to the coil at such a rate as will give the desired circulation of reaction mixture through the central tube. The material in the reactor is maintained at its boiling point so that a relatively small heat input serves to vaporize sufficient hydrocarbon to lift as much liquid hydrocarbon as desired through the central tube by a simple gas lift action. The liquid thus transferred from the bottom to the top of the reaction zone is joined there by incoming fresh and recycled hydrocarbon to be isomerized and activator, is distributed over the top of the catalyst bed by suitable perforated plates or similar device, and then flows downwardly through the bed of catalyst to the pool of liquid maintained in the lower section of the chamber. In this way a continuous circulation of the contents of the reaction chamber over the bed of catalyst is maintained simply without any mechanical action. A portion of the reaction mixture is continuously withdrawn from the lower section of the chamber and passed to suitable fractionation or other separation means.

The isomerization is thus carried out in a closed circuit of predetermined time capacity in which a favorable ratio of normal paraffin to isoparaffin is continuously maintained by continuous recirculation of the major proportion, preferably at least 90 weight or mol per cent, of the reaction mixture in the closed circuit, with continuous withdrawal of a portion, preferably less than 10 per cent, of the reactants and products and concomitant introduction of fresh feed. The maintenance of this favorable ratio insures operation of the reaction under conditions at which optimum conversion occurs. In contrast, when conversion proceeds normally in a once-through operation, the proportion of isoparaffin approaches the equilibrium value, the conversion and efficiency of the process consequently dropping off. In my manner of operation only a low per-pass conversion is required, but a high over-all yield of the desired isomer results. The rate of recirculation is as many times the rate of fresh feed introduction as may be desired, a weight ratio of at least 9:1 being generally used, and is correlated with the catalyst volume in such manner that a suitable reaction time is obtained. Inasmuch as the concentration of reactants in the hydrocarbon liquid phase is many times greater than in vapor phase operation, equipment of considerably smaller volume may be utilized, with consequent economies in construction and maintenance.

Heat of reaction is readily removed when operating in accordance with this invention by vaporization of liquid hydrocarbon, inasmuch as the system is maintained at the boiling point of the reaction mixture. Thus an undue rise in temperature cause by local overheating or otherwise is impossible. Furthermore, since the per-pass conversion is quite low and the volume of hydrocarbons passing over the catalyst relatively high, the dissipation of reaction heat in this type of operation is less of a problem than it would be if a higher per-pass conversion were being obtained. Vapors formed by heat of reaction and by the heating coil are condensed in the upper portion of the reaction chamber by cold feed being introduced thereinto or by other suitable cooling. In some cases the loss of heat to the surroundings of the reaction chamber may be sufficient to provide at least a substantial amount of this cooling. It will be seen that the extremely good thermal stability of the two phase system (liquid-vapor) maintained at the transition point, namely the boiling point, is an important advantage of my process. The close temperature control results in a minimum amount of catalyst sublimation. It has been found that the rate of sludge formation increases rapidly with rising temperature. For example, when isomerizing normal butane to isobutane with HCl as activator, sludge formation at 170° F. is quite small whereas when the temperature passes 220° F. the rate of sludge formation increases many fold with only a few degrees rise in temperature. The avoidance of local overheating in my process results in minimum sludge formation.

The downward flow of liquid over catalyst particles helps to carry sludge downwardly and away from the catalyst thereby aiding in keeping the catalyst surface sludge-free and removing sludge from the catalyst bed in less time than that required if traveling downward against an upflowing stream of fluid. This results in a sludge containing less dissolved free metal halide than would ordinarily be the case. Since this sludge is thus relatively poor in free metal halide it may be discarded with little loss. The particular construction of the reaction chamber makes it unnecessary to subject the sludge to any movement other than that described. It may be removed, continuously or intermittently, from the bottom of the reaction chamber. Since it has been found that such sludges are highly corrosive and erosive, particularly when in rapid motion, it will be seen that corrosion problems are minimized in this arrangement.

The accompanying drawing portrays diagrammatically an arrangement of apparatus for carrying out a preferred embodiment of my invention. The necessary auxiliary equipment such as valves, controls, heat exchangers, pumps, reflux accumulator, and the like may be readily supplied by one skilled in the art, and hence are not shown for the sake of simplicity. In the drawing, reaction chamber 10 is shown provided with inlet conduit 12 and outlet conduit 14. Sludge is withdrawn from the bottom of chamber 10 through outlet 16. The gas lift circulation tube 18 is disposed vertically in the center of chamber 10 and the aluminum chloride or other suitable catalytic material is placed in annular space 20. Perforated plate 22 is provided for supporting the bed of aluminum chloride, the perforations allowing liquid hydrocarbons and sludge to flow therethrough. Chamber 10 is of course provided with suitable manholes or other means not shown for allowing renewal of the catalyst charge whenever necessary. The lower portion of tube 18 is flared as shown and heating coil 24 is placed thereunder. The sludge-hydrocarbon interface is indicated at 26, while the level of the hydrocarbon liquid is maintained at 28 by any suitable liquid level device known to the art. Perforated plate 30 or its equivalent may be provided directly above the bed of aluminum chloride to aid in distributing liquid. Incoming normal butane and HCl are distributed from conduit 12 by means of perforated tube 32, which may be provided with spray devices, or in any other way.

Hot liquid reaction mixture withdrawn through ocnduit 14, passes into fractionation system 38, which is shown as a single fractionating column, but which may comprise two or more columns as the economics of any particular situation demands. Heater 40 for reboiling and cooler 42 for providing reflux are shown diagrammatically. In fractionator 38 hydrogen chloride is separated as an overhead product through line 44 and recycled to line 12 for reintroduction into reactor 10. Isobutane produced in the process is separated via conduit 46 and passed to storage or directly to its desired utilization. The bottom product of column 38 comprises unreacted normal butane and is recycled to conduit 12 via conduit 48. Small amounts of light gases, such as hydrogen, propane, etc., formed by side reactions or otherwise may be recycled or separated out as desired.

Inasmuch as the liquid in reactor 10 is saturated with aluminum chloride, the liquid drawn off through conduit 14 contains a small amount of aluminum chloride in solution which is passed into fractionator 38 from which it is withdrawn in solution in the bottom product and returned to the system through line 48. In order to avoid the possibility of any deposition of solid aluminum chloride from the saturated butane solution in line 14, a stream of aluminum chloride-free butane is introduced into line 14 at the outlet thereof from reactor 10. This diluting butane may come from any source, one preferred arrangement being shown in the drawing wherein the butane feed to the isomerization system, supplied through line 36, is divided into two parts, one passing through line 34 to effect the dilution just described, and the other passing through line 50 and cooler 52 into the top of reaction chamber 10, preferably by way of line 12. Of course other methods of recovering any aluminum chloride removed in stream 14 may be used, and this is recovered ordinarily much more readily from solution in liquid butane than when it is carried in the sublimed form in vaporous butane as described heretofore with reference to previous processes. In some arrangements, the normal butane feed to the system may be prepared in column 38, as when a mixture of normal and isobutane from an outside source must be fractionated to separate n-butane for isomerization. In this case, such a stream midght enter via line 36 and pass entirely through lines 34 and 14 to fractionator 38.

In the example described herewith, material is passed directly from reaction chamber 10 into fractionating column 38 without intermediate heating or cooling, and the kettle product from 38 is at a somewhat higher temperature than that maintained in the reaction zone, while the overhead HCl-containing stream is somewhat cooler than reaction temperature. The hot recycled normal butane is cooled to or slightly below reaction temperature by admixture with the cool overhead product from line 44 and the cool fresh feed from line 50. Of course column 38 may be operated at higher or lower temperatures and pressures as desired, with intermediate heating and/or cooling of the various streams as required by the particular conditions, as will be well understood by one skilled in the art.

As catalyst I may use granular solid metal halide such as aluminum chloride, preferably of about 4 to about 20 mesh size, or supported metal halide catalysts, for example activated bauxite or other suitable metal oxide supporting materials impregnated with aluminum chloride or the like by known methods.

In the isomerization of normal butane to isobutane, the operation is preferably carried out at a temperature in the range of about 170 to 210° F. under the vapor pressure of the system, which will be in the range of about 150 to 275 pounds per square inch absolute depending on the ratio of isobutane to normal butane and the amount of hydrogen chloride used in the reaction zone. About 5 mol per cent hydrogen chloride based on the contents of the reaction zone has been found to give satisfactory results.

The heat input provided by coil 24 to give a desired rate of circulation will, of course, depend upon the particular construction of the apparatus. The system is preferably designed to provide from about 0.5 to 10 per cent conversion per pass of one volume of liquid reaction mixture down through one volume of catalyst. Preferably this per-pass conversion is below 4 per cent. The composition of the total reaction mixture is maintained at a value which is arrived at by an economic balance between a high normal butane to isobutane ratio with consequent rapid rate of reaction on the one hand, and the increased cost of separating such mixtures on the other hand. The amount of isobutane in the mixture may be maintained as high as 50 per cent and is preferably above 10 per cent, the optimum percentage usually being in the range of 20 to 40 per cent isobutane.

It will be appreciated by one skilled in the art that various modifications of my invention can be practiced, in the light of the present disclosure and teachings, without departing from the spirit of the teachings or from the scope of the claims. Thus, any light gases which may be formed in the reaction, or which may be present in the charge, will tend to accumulate unless continuously or periodically removed from the system, as by discharge of a part or portion of the material passing through line 44, by means not shown. Likewise, heavier material may be kept at a suitable low value, or completely eliminated, through means not shown, as by discharging a part or portion of the material passing through line 48.

I claim:
1. A process for the isomerization of normal paraffins to isoparaffins which comprises providing a reaction zone comprising three superimposed zones, maintaining in the center zone a pervious bed of metal halide isomerization catalyst, maintaining in the lower zone liquid hydrocarbons comprising normal and isoparaffins, generating gas by vaporizing hydrocarbons in said lower zone, continuously moving liquid hydrocarbons by gas lift with said gas from said lower zone to the upper zone, and continuously flowing the thus lifted liquid hydrocarbons by gravity through said center zone containing catalyst and back into said lower zone whereby a continuous circulation of liquid hydrocarbons over said catalyst is maintained.

2. The process of claim 1 in which heat of reaction is removed by vaporization of liquid hydrocarbons in said catalyst bed.

3. The process of claim 1 in which normal paraffin feed is continuously introduced into said upper zone, normal and isoparaffins are continuously removed from said lower zone, the isoparaffin concentration in the reaction mixture is maintained substantially below equilibrium value, and the ratio of rate of hydrocarbon circulation over said catalyst to rate of feed introduction is at least 9:1.

4. The process of claim 1 in which said hydrocarbons are maintained at the boiling point, relatively cool normal paraffin feed and hydrogen halide activator are continuously introduced into said upper zone thereby condensing vapors therein, a portion of the reaction mixture is continuously removed from the reaction zone, isoparaffins are separated therefrom, and unisomerized normal paraffins are recycled to the reaction zone.

5. The process of claim 1 in which said catalyst comprises anhydrous aluminum chloride, and is activated by hydrogen chloride.

6. The process of isomerizing normal butane to isobutane which comprises continuously carrying out the following steps: vaporizing normal and isobutane in a vertical circulation zone in a reaction zone, causing vapor thus formed to lift liquid normal and isobutane therein, causing the liquid attaining the top of said circulation zone to pass downwardly in a portion of said reaction zone surrounding said circulation zone and thereby establishing an endless flowing circuit of reaction materials, contacting said normal butane in admixture with isobutane in said portion of said reaction zone surrounding said circulation zone with aluminum chloride catalyst in the presence of hydrogen chloride to effect isomerization thereof, maintaining the hydrocarbons in said reaction zone at the boiling point under the pressure prevailing, condensing vapors in the upper portion of said reaction zone, introducing normal butane to be isomerized into the top of said reaction zone, maintaining the isobutane content of said reaction zone in the range of 20 to 40 per cent based on the total hydrocarbon content thereof, and removing hydrocarbons from the bottom of said reaction zone for the recovery of isobutane therefrom.

7. Apparatus for the isomerization of saturated hydrocarbons which comprises a reaction chamber, an open centrally located vertical gas lift tube having a flared lower end, heating means within said lower end, a perforated catalyst support surrounding said tube for supporting solid metal halide isomerization catalyst in the annular space between said tube and the walls of said reaction chamber, means for maintaining a liquid level below said perforated support but above said heating means, means for introducing relatively cool hydrocarbon feed into the top of said chamber, means to remove liquid hydrocarbons from the lower part of said chamber, and means to remove sludge from the bottom of said chamber.

WENDELL W. ROACH.